(12) United States Patent
Campbell

(10) Patent No.: US 6,705,039 B1
(45) Date of Patent: Mar. 16, 2004

(54) FLEXIBLE FISH LANDING NET

(76) Inventor: Phillip John Campbell, 9004 Stony Run Dr., Raleigh, NC (US) 27615

( * ) Notice: Subject to any disclaimer, the term of this patent is extended or adjusted under 35 U.S.C. 154(b) by 0 days.

(21) Appl. No.: 10/308,820

(22) Filed: Dec. 3, 2002

Related U.S. Application Data

(63) Continuation-in-part of application No. 09/824,497, filed on Apr. 2, 2001, now abandoned.
(60) Provisional application No. 60/301,103, filed on Jun. 26, 2001.

(51) Int. Cl.$^7$ .............................................. A01K 77/00
(52) U.S. Cl. ..................................... 43/7; 43/5; 43/12
(58) Field of Search ........................ 43/7, 11, 12, 100, 43/102, 105, 5

(56) References Cited

U.S. PATENT DOCUMENTS

| | | | | |
|---|---|---|---|---|
| 1,262,507 A | * | 4/1918 | Johnston | 43/105 |
| 1,340,874 A | * | 5/1920 | Brown | 43/12 |
| 1,348,398 A | * | 8/1920 | Eberhardt | 43/12 |
| 1,351,628 A | * | 8/1920 | Dukas | 43/12 |
| 1,403,171 A | * | 1/1922 | Koenig | 43/105 |
| 1,420,396 A | * | 6/1922 | Warren, Sr. | 43/12 |
| 1,457,886 A | * | 6/1923 | Dukas | 43/12 |
| 1,797,251 A | * | 3/1931 | Tyrell | 43/5 |
| 2,194,621 A | * | 3/1940 | Skrjanc et al. | 43/12 |
| 2,457,922 A | * | 1/1949 | Robinson | 43/12 |
| 2,491,703 A | * | 12/1949 | Bell | 43/12 |
| 2,520,780 A | * | 8/1950 | Pieron | 43/105 |
| 2,539,563 A | * | 1/1951 | Baloun | 43/12 |
| 2,557,079 A | * | 6/1951 | Cutri | 43/7 |
| 2,652,656 A | * | 9/1953 | Glasser | 43/105 |
| 2,728,164 A | * | 12/1955 | Mears | 43/105 |
| 2,767,501 A | * | 10/1956 | Bjorksten | 43/7 |
| 2,814,899 A | * | 12/1957 | Brosius | 43/12 |
| 2,911,755 A | * | 11/1959 | Rabin | 43/105 |
| 3,224,131 A | * | 12/1965 | Parse | 43/12 |
| 3,314,187 A | * | 4/1967 | Marcinkowski | 43/105 |
| 3,484,981 A | * | 12/1969 | Gilmer | 43/105 |
| 3,645,034 A | * | 2/1972 | Phahler | 43/105 |
| 4,021,956 A | * | 5/1977 | Hogg | 43/12 |
| 4,031,650 A | * | 6/1977 | Popeil | 43/12 |

(List continued on next page.)

FOREIGN PATENT DOCUMENTS

| | | | | |
|---|---|---|---|---|
| DK | 3827 B1 | * | 9/1892 | 43/105 |
| GB | 1181354 B1 | * | 2/1970 | |
| GB | 1545476 B1 | * | 5/1979 | |
| GB | 2082881 B1 | * | 3/1982 | |
| GB | 2150801 B1 | * | 7/1985 | |
| GB | 2329566 B1 | * | 3/1999 | |
| JP | 8-56532 B1 | * | 3/1996 | |
| JP | 9-113 B1 | * | 1/1997 | |
| JP | 8-116827 B1 | * | 5/1999 | |
| JP | 2001-245553 B1 | * | 9/2001 | |
| JP | 2003-92957 B1 | * | 4/2003 | |
| WO | WO-98/05203 B1 | * | 2/1998 | |

*Primary Examiner*—Darren W. Ark
(74) *Attorney, Agent, or Firm*—Mills Law Firm PLLC

(57) ABSTRACT

A fish landing net for landing heavy fish from an elevated location includes a flexible retaining hoop having a normal open position. A netting has an open end carried at the hoop periphery and a depending closed end providing an enclosure for securing and carrying the fish. A lifting rigging is attached by three outwardly and downwardly extending rope sections to the hoop for raising and lowering said hoop member at the elevated location. The hoop has an initial prestressing establishing the open position and is locally anneals at the attachment sites for permitting inwardly deforming of the periphery under loading conditions of the fish in the netting thereby resulting in an inward constricting of the hoop opening during landing of the fish.

12 Claims, 7 Drawing Sheets

U.S. PATENT DOCUMENTS

| | | | |
|---|---|---|---|
| 4,143,480 A | * | 3/1979 | Bott .......................... 43/105 |
| 4,169,331 A | * | 10/1979 | Baker ........................... 43/11 |
| 4,292,753 A | * | 10/1981 | Yesuratnam ..................... 43/5 |
| 4,305,219 A | * | 12/1981 | Ratliffe ....................... 43/105 |
| 4,492,052 A | * | 1/1985 | Davis ........................... 43/12 |
| 4,516,347 A | * | 5/1985 | Dickie .......................... 43/11 |
| 4,538,376 A | * | 9/1985 | Morton ....................... 43/100 |
| 4,774,783 A | * | 10/1988 | Willard ......................... 43/12 |
| 5,276,989 A | * | 1/1994 | Lumb et al. ................... 43/11 |
| 5,497,580 A | * | 3/1996 | Vanderplaats ................ 43/12 |
| 5,501,026 A | * | 3/1996 | Bryant et al. ................. 43/12 |
| 5,605,003 A | * | 2/1997 | Krc et al. ..................... 43/12 |
| 5,673,510 A | * | 10/1997 | Campbell .................... 43/105 |
| 5,737,869 A | * | 4/1998 | Murguido .................... 43/105 |
| 5,822,908 A | * | 10/1998 | Blanchard ..................... 43/11 |
| 6,598,335 B2 | * | 7/2003 | Akhtar et al. ................ 43/12 |
| 2002/0139032 A1 | * | 10/2002 | Campbell ...................... 43/11 |

* cited by examiner

FLEXIBLE FISH LANDING NET

RELATED APPLICATIONS

This application is a continuation-in-part application of U.S. Ser. No. 09/824,497 filed on Apr. 2, 2001 now abandoned in the name of Phillip John Campbell and entitled "Flexible Fish Landing Net" and claims the benefit of United States Provisional Application No. 60/301,103 filed on Jun. 26, 2001 in the name of Phillip John Campbell and entitled "Flexible Fishing Net Hoop".

FIELD OF THE INVENTION

The present invention relates to net nets for landing fish, and, in particular, to a flexible fish landing net for use from elevated fishing stations.

BACKGROUND OF THE INVENTION

Sport fishing is oftentimes conducted from elevated locations such as fishing piers and bridges. Various species of varying sizes are commonly caught at such locations. Smaller fish present few problems in landing with the size of the fish being within the strength limitations of the fishing tackle, thereby enabling landing by conventional reeling. Larger fish, however, can present considerable problems. Where a larger fish is hooked, there is a risk that the line will break, due to the weight and movement of the fish prior to successful landing. Under such circumstances, landing may be attempted by traversing the pier until a water location is reached, at which time the fish can be beached, a difficult, cumbersome and time consuming task. At heavily trafficked sites, rental shops may be available whereat the fisherman may be able to rent a suitable large mouth rigid landing net. Inasmuch as such landing nets are large, bulky and costly, few fishermen normally have this type of equipment. Typical of such a net is disclosed in Great Britain Patent No. GB 1,181,354 to Goddard wherein a solid metal ring supports a landing net and is raised as a rigid ring by lifting cords. The net is neither flexible or collapsible. A further version is disclosed in U.S. Pat. No. 3,314,187 to Marcinkowski wherein the netting is collapsible to position a crab trap, however, the support hoop is a rigid circular ring. A limitedly flexible crab net is disclosed in U.S. Pat. No. 2,520,780 to Pieron wherein the periphery of the net is provided by two semi-circular hoops that are diametrically constrained, such that upon lifting the sides are compressed inwardly narrowing the net perimeter.

Conventional landing nets are not adapted for such locations. The typical landing net has a fixed hoop with a small attached handle. No provisions are made for lowering these nets from elevated stations. Thus, nets of the type disclosed in U.S. Pat. No. 2,814,899 to Brosius, U.S. Pat. No. 4,021,956 to Hogg, U.S. Pat. No. 4,169,331 to Baker, and U.S. Pat. No. 4,774,783 to Willard have little utility in pier and bridge elevated fishing.

In view of the foregoing, it would be desirable to provide a fish landing net for pier, bridge and like elevated fishing that could readily be used by fishermen for safely and conveniently ensnaring heavy fish.

SUMMARY OF THE INVENTION

The present invention provides a fish landing net that may be collapsed for convenient storage and transportation, and expanded at the site to a full-size landing net that may be lowered from elevated location into the water for netting large and heavy fish that might otherwise escape due to tackle breakage or be released because of difficulties in successfully landing the fish. The landing net includes a flexible, prestressed circular hoop to which heavy duty netting is attached. The hoop is attached to a lifting line by three circumferentially spaced support ropes. The hoop sections around the support ropes have an annealed inner surface, which locally reduces the compressive strength and facilitates reverse bending under loading. When a larger fish is hooked and brought to an underneath location, the net is lowered into the water and maneuvered to ensnare the fish. As the net is raised, the loading forces overcome the prestressing and the reduced compressive strength at lifting locations thereby inwardly deflecting these section and constricting the hoop size and preventing the fish from escaping during landing as well as increasing the stability of the net during vertical movement. When the fish is landed and the load removed, the hoop returns to the original shape for reuse. For storage or transportation, the net hoop may be diametrically twisted into a "Figure-8" shape thereby causing the hoop to fold into a plurality of concentric hoop sections, much is the same manner as band saw blades. The compacted hoop may be conveniently transported along normal fishing gear to be deployed when needed.

Accordingly, it is an object of the present invention to provide a fish landing net for heavy fish that is convenient to transport and easy to deploy.

Another object of the invention is to provide a fish landing net that provides a large opening for ensnaring a large fish and a constricted opening for retaining the fish during vertical movement to a landing site.

A further object of the invention is to provide a fish landing net that is expandable on site to functional sizes and collapsible for convenient storage and transportation.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
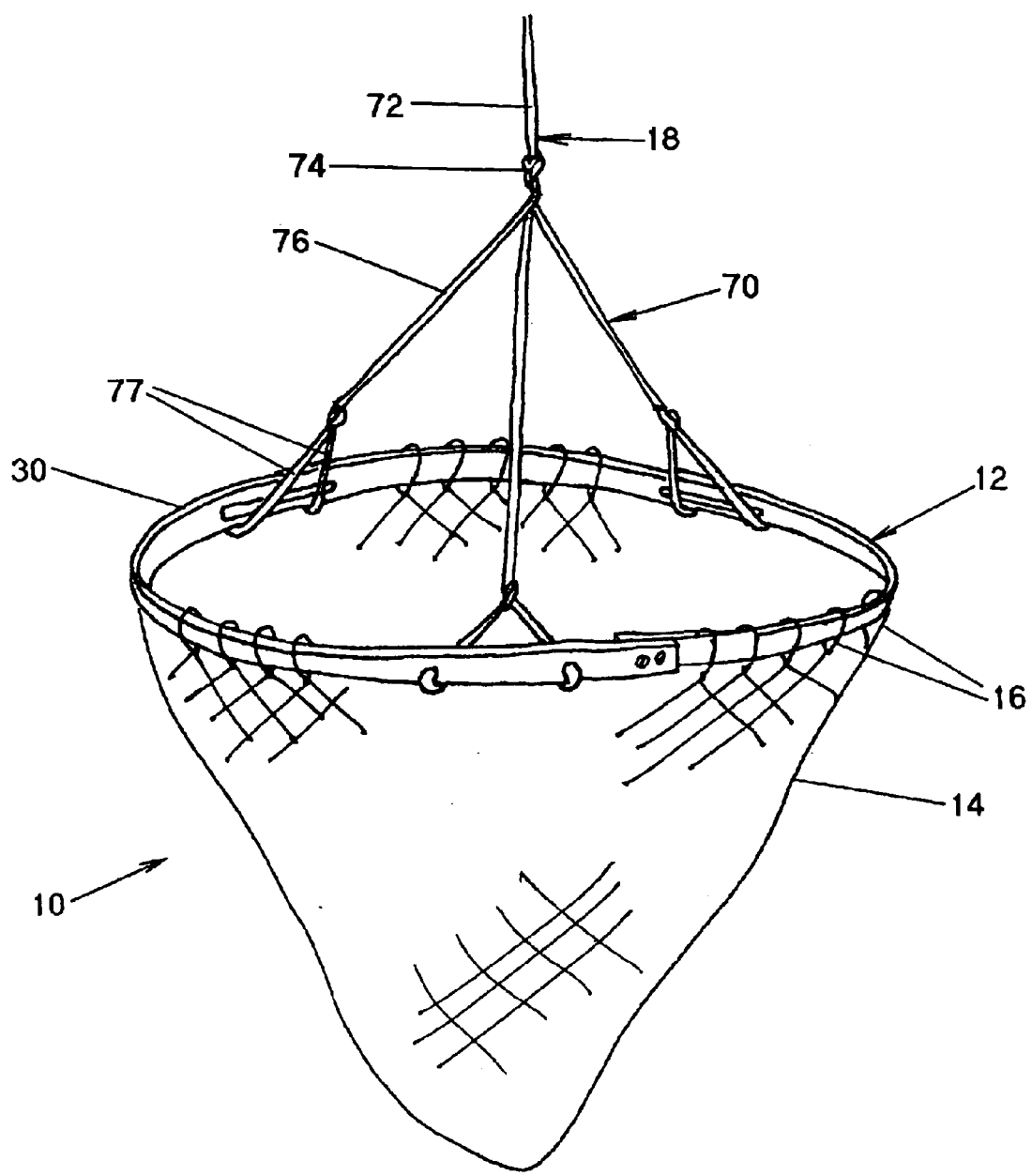
FIG. 1 is a perspective view of a flexible fish landing net according to an embodiment of the invention, in the open position.

Referring to the drawings for the purpose of describing the preferred embodiment and not for limiting same, FIG. 1 illustrates a flexible fish landing net 10 for landing fish from a elevated fishing station, such as a pier or bridge wherein the weight and size of the fish is potentially greater than the strength of the fishing tackle. As such, the net is distinguished from regular fishing nets used by sports fisherman and typically ranges in size from two to three feet or larger.

The landing net 10 comprises a flexible retaining hoop 12 having a generally circular configuration in the illustrated open position, a netting 14 having top loops 16 periodically peripherally threaded over the retaining hoop 12 and depending therebelow, and a lifting rigging 18 attached at three circumferentially spaced locations to the hoop 12 and operable for lowering and raising the net 10 from the fishing station.

Figure 2:
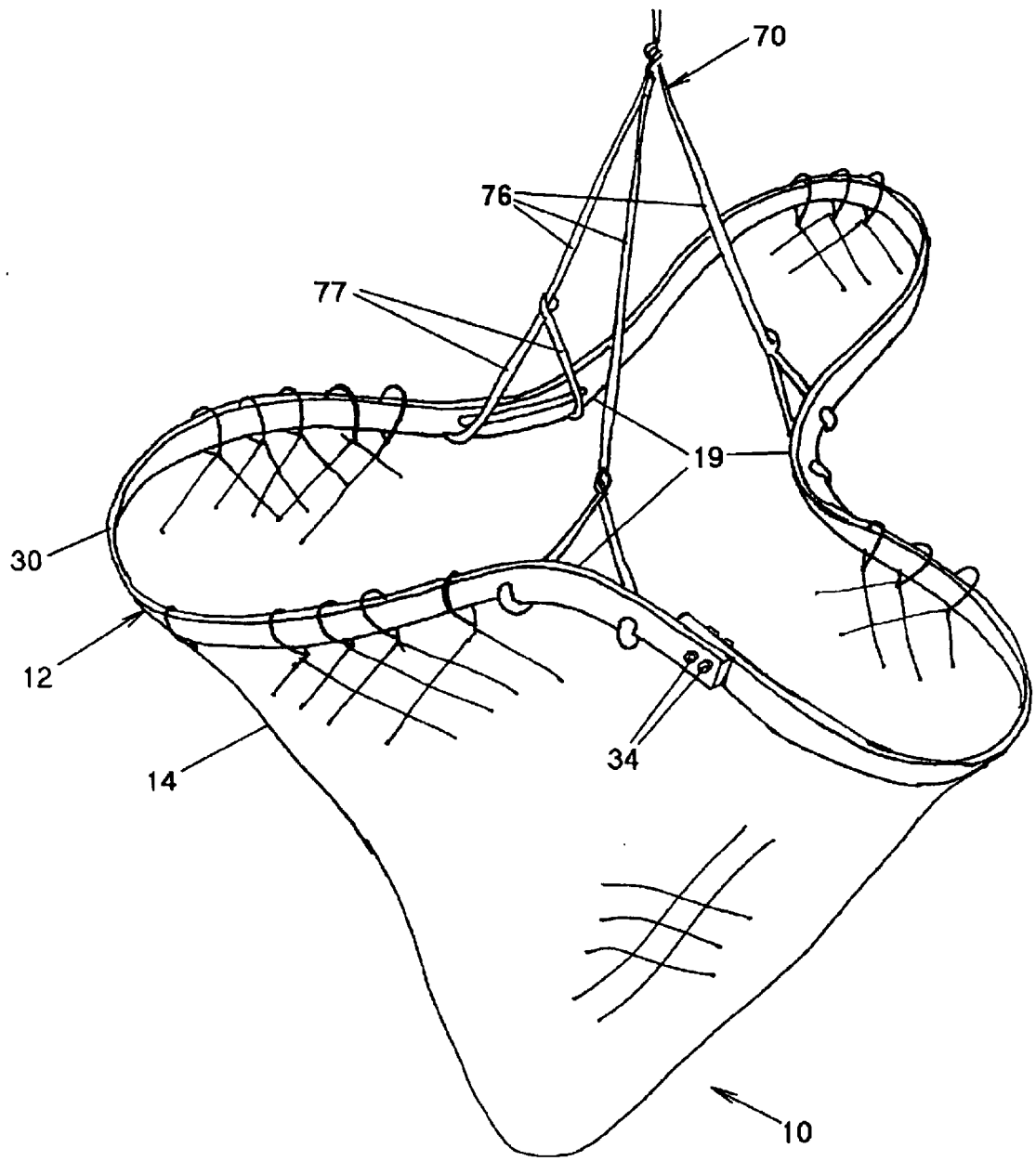
FIG. 2 is a perspective view of the fish landing net of FIG. 1, in the closed position.

During the raising of the net 10, with a larger fish carried in the netting, the load and the lifting rigging 18 are operative to cause the retaining hoop 12 to flex inwardly at three reversely bent lobes 19 to a closed position of restricted opening during raising movement, as shown in FIG. 2, to securely retain the fish within the netting 14 and stabilizing the lifting load.

Figure 8:
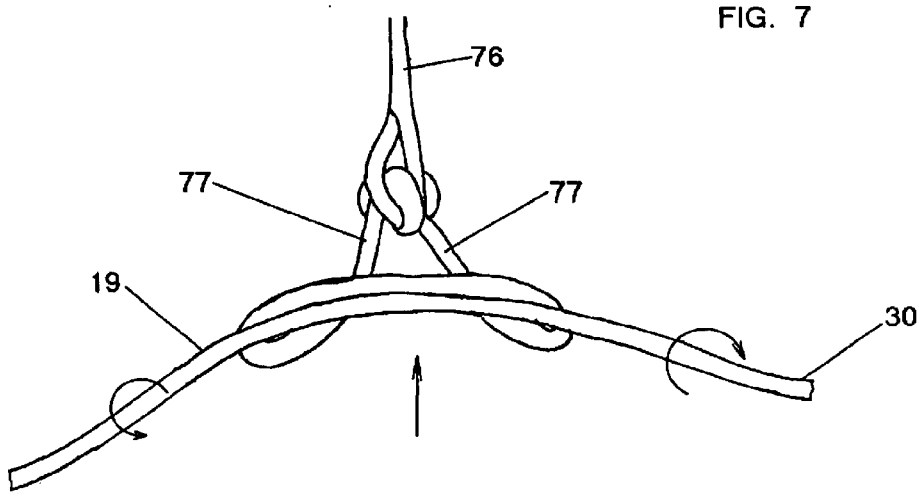
FIG. 8 is a view similar to FIG. 8 showing lifting rope bending the retaining hoop section toward the closed position.
Figure 9:
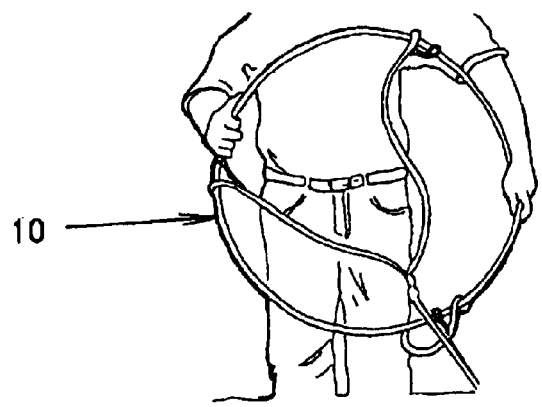
FIGS. 9 through 11 are side elevation views showing the collapsing the retaining hoop from the open position to the collapsed position.
Figure 10:
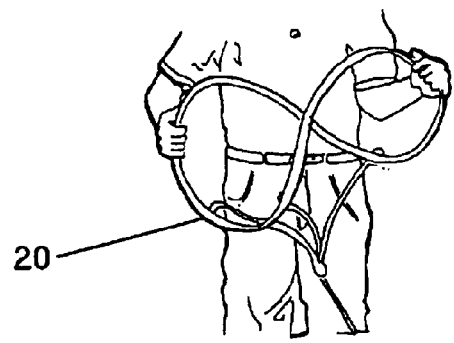
Figure 11:
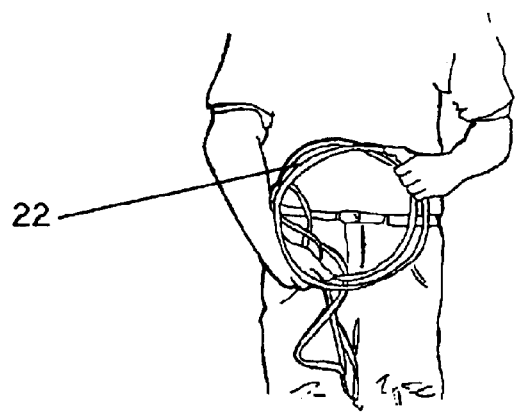

Referring to FIGS. 9 through 11, for storage and transportation, the retaining hoop 12 in the open position of FIG. 9 may be diametrically twisted into a "Figure-8" position, as shown in FIG. 10, and inwardly collapsed to form a series of concentric subhoops 20 as shown in FIG. 11, thereby establishing a compact storage position.

More particularly, the retaining hoop 12 is formed of an elastic material and establishes a prestressed circular condition in the open position sufficient for maintaining the continuous open profile while being insufficiently stressed or strong to resist locally inward deflection of the nodes 19 toward the closed positions shown in FIGS. 2 in the presence of a sufficiently large fish. As described in greater detail below, the retaining hoop is annealed at the inner surface by reverse bending at the attachment locations to reduce the inward loading required for establishing the nodes 19 and facilitate the inward deflection.

Figure 3:
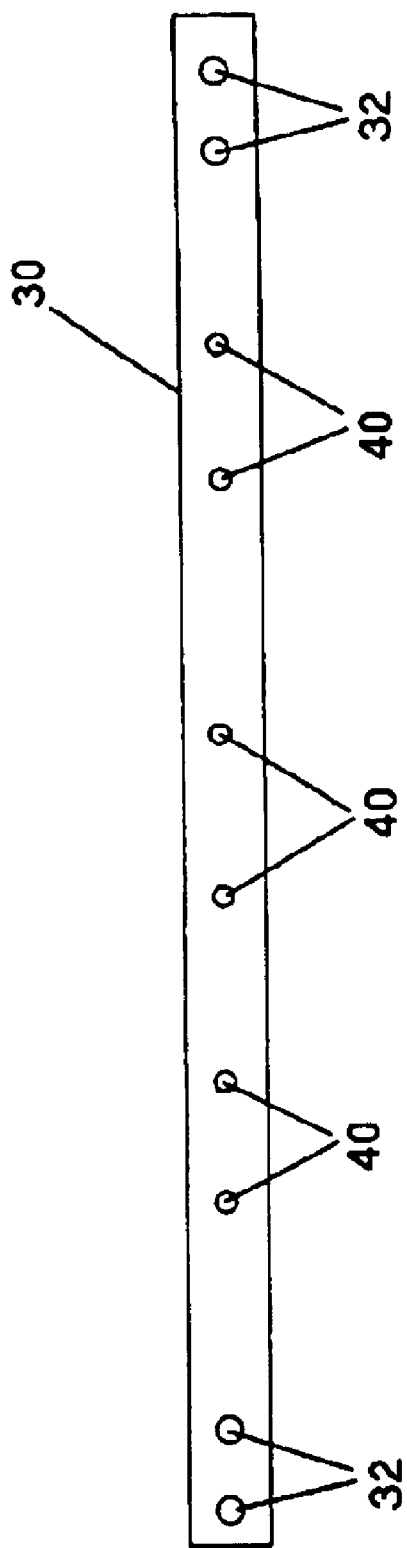
FIG. 3 is a side elevation view of the retaining hoop in the unformed position.
Figure 4:
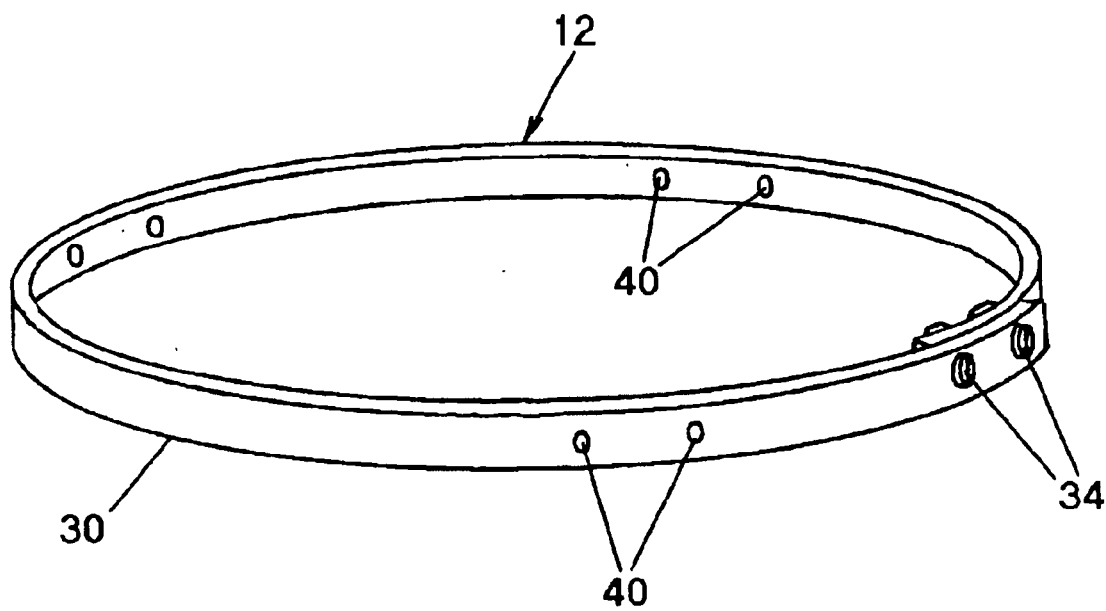
FIG. 4 is a perspective view of the retaining hoop in the open position.

Referring to FIG. 3, the retaining hoop 12 may be formed from an elongated single strip 30 of planar material. The strip 30 has a rectangular cross section of moderate to high aspect ratio for preventing vertical flexing about the transverse section axis while permitting the aforementioned inward deflection about the longitudinal section axis in the presence of threshold loading. An aspect ratio of height to thickness of at least 2:1 is satisfactory, an aspect ration in the range of 3:1 to 6:1 desirable, and an aspect ratio of about 4:1 preferred. A preferred material is plastic such a nylon.

The strip 30 is provided with a plurality of through holes for use in assembly and rigging. A pair of fastener holes 32 are formed at each end of the strip 30. For assembly the ends are overlapped and suitable fasteners 34, such as nuts and bolts, are inserted through the fastener holes and tightened to fixedly establish a circular shape for the retaining hoop by flexing the strip and establishing a stressed outer skin condition therein. Three evenly circumferentially and closely spaced sets of rigging holes 40 are formed along the length of the strip 30. The rigging holes 40 in the assembled hoop are equally circumferentially spaced 120° apart. Consistent with the above, a retaining hoop formed of nylon with a ¾ by 3/16 inch cross section, is effective for a 30 inch diameter hoop.

The netting 14 may be formed of any suitable, commercially available material and is configured to provide a closed lower end and an open upper end 52 terminating with the end loops 16. The end loops 16 are threaded onto the strip 30 prior to assembly and thereafter uniformly circumferentially spaced thereabout. The length of the netting is sufficient to provide ample volume for retaining targeted species and sizes of fish.

Figure 5:
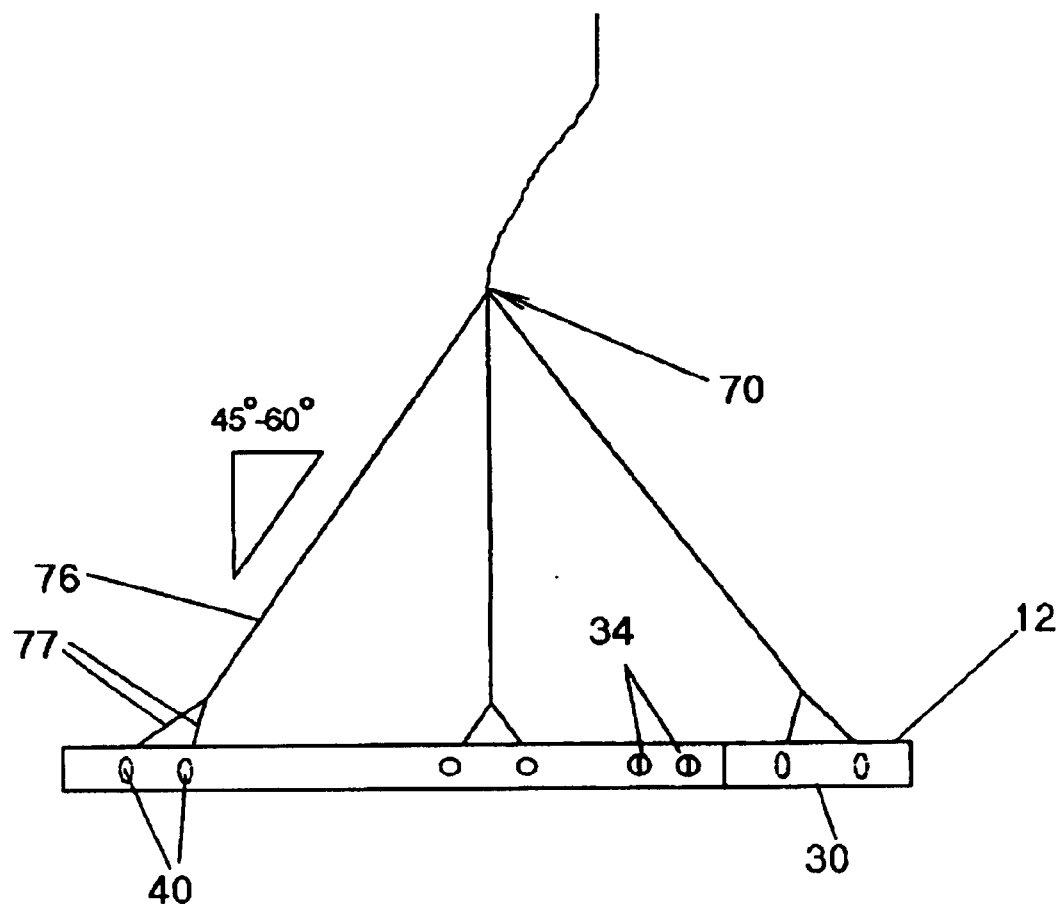
FIG. 5 is side schematic view of the landing net in the open position, with the net attached, showing the suspension of the retaining hoop.
Figure 6:
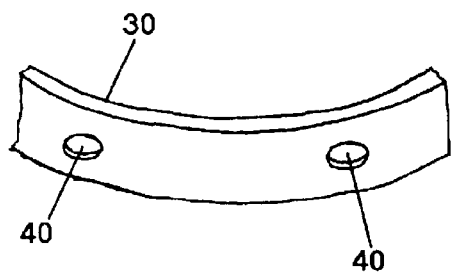
FIG. 6 is an enlarged fragmentary view of the retaining hoop showing the lifting rope mounting holes.
Figure 7:
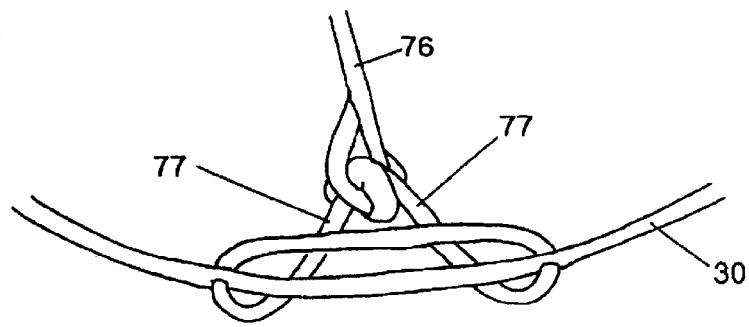
FIG. 7 is a view similar to FIG. 6 showing the lifting rope on the retaining hoop in the open position.

The rigging 16 comprises a three-point rigging at a lower section 70 and an upper section 72 interconnected by a middle coupling section 74. Referring to FIGS. 6 through 8, the lower section 70 includes three arms 76. Each arm 76 terminates with outwardly diverging end 77 establishing circumferentially spaced loadings at the attachment locations. The arm is sequentially threaded inwardly under the hoop along a first run, through one of the holes 40, along the inner periphery of the hoop, and outwardly through the other hole. The free end is then knotted to establish the lengths of the ends. In the preferred embodiment, the ropes are a tubular braided polyethylene. The distal end is heat terminated and inserted into the tubular core to fix the attachment. The upper ends of the rope arms 76 are gathered and knotted to form a lifting loop at the coupling section 74. The lower end of the upper section 72, preferably a single strand of roping, is attached at the lifting loop with a non-slipping marine knot. Under loading conditions, it bas been found as shown in FIG. 5 that an inclination of the arms at about 45° to 60° with respect to vertical provides preferable results.

Under sufficient loading at the net, the inwardly directed loading forces at the lower section of the rigging will overcome the prestressing and inwardly reversely flex the hoop at the nodes 19 at the attachment locations. The nodes 19 converging toward the center of the deformed hoop, causing the hoop to assume a progressively closed position under loading conditions that exceed the threshold prestressed value. Thus smaller fish raised by the landing net may be insufficient to close the net, but may nonetheless be securely upwardly raised under stable, balanced conditions. Larger fish, more prone to activity, will be prevented from escape, by the flexing closure of the hoop.

The flexing characteristics of the hoop are enhanced by locally annealing the hoop sections adjacent the attachment sections surrounding the holes sufficient to lower the compressive strength thereat and accommodate the reverse deflection. For the preferred nylon hoop material, the hoop sections may be annealed by reverse flexure as shown by the arrows in FIG. 8. Such annealing has been determined to significantly reduce the net closing forces required to effect the collapse of the hoop as shown in FIG. 2. The nodal tendencies are also increased by the circumferentially spaced points, and by the ends 77 engaging the lower surface of the hoop and exerting further inward and upward force vectors for overcoming the residual annealed compressive strength at the inner surface and promoting the nodal buckling.

The annealing of the strip may be performed either before hoop formation of after assembly, by manual or mechanical bending. A limited number of moderate bends are generally sufficient.

In use, when the user has hooked a fish and desires to utilize the landing net 10 for securing and landing a fish from the elevated fishing station, the collapsed landing net is removed from the carrying container and the subhoops reversely rotated allowing the prestressing to expand the hoop 12 to the open position. The expanded net is lowered into the water and maneuvered below the fish. The rigging 18 is manually raised to capture the fish within the netting 14 in the confines of the hoop. As the net is raised above water level, the increasing loading on the rope arms 76, in the presence of a sufficiently large fish, will inwardly deflect the hoop 12 at the node 19 narrowing the top opening and thereby securing the fish therewithin. When the fish is landed at the elevated station, the loading is released allowing the hoop to assume the open position and faciliatating safe removal of the landed fish.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A fish landing net for landing heavy fish from an elevated location, comprising: a hoop member formed of an elastic material and having a periphery defining a normal circular open position; a netting material having an upper end carried on said hoop member at said periphery and a closed end operationally depending therefrom, said netting material providing an enclosure for securing and carrying tile fish; a rigging member attached by three outwardly and downwardly extending flexible linear members at three equally circumferentially spaced lifting positions to said hoop member for raising and lowering said hoop member at the elevated location, the hoop member having a prestressing establishing said open position and being annealed at said lifting positions to locally reduce the compressive strength thereat so as to permit inwardly nodal deformation of said periphery at said lifting positions under loading conditions of the fish in the netting material resulting in constricting of said periphery from said open position to a closed position.

2. A fish landing net for landing heavy fish from an elevated location, comprising: a one-piece elongated nylon strip having a rectangular cross section having opposite ends overlapped and fastened to provide a circular hoop and a stressed condition therein to maintain a circular shape; three pairs of circumferentially spaced attachment sites on said hoop, with said hoop being annealed at an inner surface thereof adjacent said attachment sites for reducing the compressive strength thereat; a lifting rigging including three downwardly and outwardly extending arms having outwardly diverging ends separately connected at said attachment sites; and an open ended net attached at an open end to said hoop.

3. The fish landing net as recited in claim 2 wherein said cross section has a height to width ratio in the range of 2:1 to 6:1.

4. The fish landing net as recited in claim 3 wherein said ratio is about 4:1.

5. The fish landing net as recited in claim 4 wherein said hoop is formed by said nylon strip which comprises a singular linear section having said overlapped opposite ends clamped together by fastening means.

6. The fish landing net as recited in claim 5 wherein said fastening means comprises mechanical fasteners.

7. The fish landing net as recited in claim 3 wherein said attachment sites on said hoop comprise circumferentially spaced holes and said diverging ends of said arms are threaded therethrough to establish spaced inwardly directed forces on said hoop for overcoming said compressive strength and permitting local inward deflection thereat.

8. The fish landing net as recited in claim 7 wherein said diverging ends extend inwardly over the bottom surface of said hoop at said attachment sites for establishing upwardly and inwardly directed forces for promoting said local inward deflection.

9. The fish landing net as recited in claim 8 wherein said lifting rigging is formed of tubular braided plastic.

10. A method of forming a flexible collapsible fishing net comprising the steps of: providing an elongated strip of plastic material having a rectangular cross section with a height to width ratio in the range of about 2:1 to 6:1; forming said strip into a circular shaped hoop with overlapping ends; fixedly connecting said overlapping ends; locally annealing an inner surface of said strip at a plurality of circumferentially spaced locations to reduce the compressive strength thereat; attaching an open ended netting to said strip; attaching first ends of linear lifting members to said strip at said spaced locations; connecting second ends of said linear lifting members to a main lifting member for raising and lowering said strip and net with respect to a fishing site; establishing said annealing at a level that permits inwardly nodal deflection of said spaced locations under predetermined loading conditions at said net.

11. The method as recited in claim 10 wherein pairs of circumferentially spaced holes are formed at said locations and said first ends having diverging terminal portions separately connected in load bearing relation at said holes.

12. The method as recited in claim 11 wherein three circumferentially spaced locations and three linear lifting members are provided.

* * * * *